United States Patent
Hethcock et al.

(10) Patent No.: US 9,713,913 B2
(45) Date of Patent: Jul. 25, 2017

(54) COMPOSITE CORE AND METHOD OF MAKING SAME

(75) Inventors: James D. Hethcock, Colleyville, TX (US); Kenneth E. Nunn, Colleyville, TX (US); Paul Oldroyd, Azle, TX (US)

(73) Assignee: Textron Innovations Inc., Providence, RI (US)

( * ) Notice: Subject to any disclaimer, the term of this patent is extended or adjusted under 35 U.S.C. 154(b) by 956 days.

(21) Appl. No.: 13/260,690

(22) PCT Filed: Feb. 4, 2011

(86) PCT No.: PCT/US2011/023681
§ 371 (c)(1),
(2), (4) Date: Sep. 27, 2011

(87) PCT Pub. No.: WO2011/097433
PCT Pub. Date: Aug. 11, 2011

(65) Prior Publication Data
US 2012/0021165 A1    Jan. 26, 2012

Related U.S. Application Data

(60) Provisional application No. 61/301,463, filed on Feb. 4, 2010.

(51) Int. Cl.
*B32B 3/12* (2006.01)
*B32B 5/26* (2006.01)
(Continued)

(52) U.S. Cl.
CPC ............ *B32B 5/26* (2013.01); *B32B 3/12* (2013.01); *B32B 3/20* (2013.01); *B32B 5/12* (2013.01);
(Continued)

(58) Field of Classification Search
CPC ........................................ D03D 5/06
See application file for complete search history.

(56) References Cited

U.S. PATENT DOCUMENTS 3,058,125 A * 10/1962 Zerbee ............... A47C 7/425
245/1
3,879,243 A * 4/1975 Medney ............. B29C 53/587
156/173
(Continued)

FOREIGN PATENT DOCUMENTS

DE        2363155 A1    7/1975
EP        0367135 A2    5/1990
(Continued)

OTHER PUBLICATIONS

International Search Report and the Written Opinion of the International Searching Authority mailed by ISA/USA, U.S. Patent and Trademark Office on Mar. 31, 2011 for International Patent Application No. PCT/US11/23681, 11 pages.
(Continued)

*Primary Examiner* — David Sample
*Assistant Examiner* — Nicholas W Jordan
(74) *Attorney, Agent, or Firm* — James E. Walton

(57) ABSTRACT

A composite core includes a plurality of tubes, each the plurality of tubes comprising a plurality of fibers disposed in a polymeric matrix. Adjacent tubes of the plurality of tubes are adhesively bonded to one another along sides of the adjacent tubes. A method of making a composite core includes the steps of providing a plurality of tubes, each of the plurality of tubes including a plurality of fibers disposed in a polymeric matrix, and adhesively bonding adjacent tubes of the plurality of tubes along sides of the adjacent tubes. A method of making a composite core such that a removable band is included in the core, the removable band
(Continued)

being configured to be removable through a procedure subsequent to the cure of the composite core, thereby producing gaps in the core.

11 Claims, 8 Drawing Sheets

(51) Int. Cl.
    *B32B 5/12*     (2006.01)
    *B32B 5/28*     (2006.01)
    *B32B 7/12*     (2006.01)
    *B32B 27/04*     (2006.01)
    *B32B 27/12*     (2006.01)
    *D04C 3/48*     (2006.01)
    *B32B 7/04*     (2006.01)
    *B32B 3/20*     (2006.01)

(52) U.S. Cl.
CPC .................. *B32B 5/28* (2013.01); *B32B 7/04* (2013.01); *B32B 7/12* (2013.01); *B32B 27/04* (2013.01); *B32B 27/12* (2013.01); *D04C 3/48* (2013.01); *B32B 2250/40* (2013.01); *B32B 2255/02* (2013.01); *B32B 2255/26* (2013.01); *B32B 2260/021* (2013.01); *B32B 2260/046* (2013.01); *B32B 2262/0269* (2013.01); *B32B 2262/106* (2013.01); *B32B 2307/50* (2013.01); *Y10T 428/24074* (2015.01); *Y10T 428/31504* (2015.04)

(56) References Cited

U.S. PATENT DOCUMENTS

| | | | |
|---|---|---|---|
| 4,025,675 A | 5/1977 | Jonda | |
| 4,600,619 A | 7/1986 | Chee et al. | |
| 5,108,810 A | 4/1992 | Williams | |
| 5,128,192 A | 7/1992 | Narasaki | |
| 5,217,769 A * | 6/1993 | Harris | D03D 15/06 428/192 |
| 5,567,500 A | 10/1996 | Marshall et al. | |
| 5,624,622 A | 4/1997 | Boyce et al. | |
| 5,632,834 A | 5/1997 | Ostertag et al. | |
| 5,651,850 A | 7/1997 | Turner et al. | |
| 5,730,920 A | 3/1998 | Marshall et al. | |
| 5,741,574 A | 4/1998 | Boyce et al. | |
| 5,789,060 A | 8/1998 | Marshall et al. | |
| 5,888,608 A | 3/1999 | Tsai | |
| 5,981,025 A | 11/1999 | Marshall et al. | |
| 6,151,743 A * | 11/2000 | Church et al. | 428/112 |
| 6,503,596 B1 | 1/2003 | Fellman | |
| 6,928,715 B2 | 8/2005 | Fanucci et al. | |
| 7,063,763 B2 * | 6/2006 | Chapman, Jr. | 156/175 |
| 2005/0120538 A1 | 6/2005 | Fanucci | |

FOREIGN PATENT DOCUMENTS

| | | |
|---|---|---|
| EP | 1108896 | 6/2001 |
| GB | 1274139 | 5/1972 |
| JP | 2004358806 | 12/2004 |
| JP | 2006247867 | 9/2006 |

OTHER PUBLICATIONS

Chinese Office Action in related Chinese patent application No. 201180008434, 4 pages, mailed Jan. 23, 2014.
European Office Action in related European patent application No. 11740388.1, 3 pages, mailed Feb. 17, 2014.
Extended European Search Report from the European Patent Office in related European Application No. 11740388, mailed Nov. 5, 2012, 7 pages.
Canadian Office Action in related Canadian patent application No. 2,786,737, 2 pages, mailed Dec. 18, 2013.
Office Action dated Jul. 22, 2014 from counterpart CA App. No. 2,786,737.
Office Action dated Sep. 24, 2014 from counterpart CN App. No. 201180008434.0.
Office Action dated Feb. 10, 2015 from counterpart CN App. No. 201180008434.0.
Office Action dated Jul. 28, 2015 from counterpart CN App. No. 201180008434.0.
Office Action dated May 12, 2015 from counterpart CA App. No. 2,786,737.
Office Action dated Jun. 6, 2017 from counterpart IN App. No. 6467/DELNP/2012.

* cited by examiner

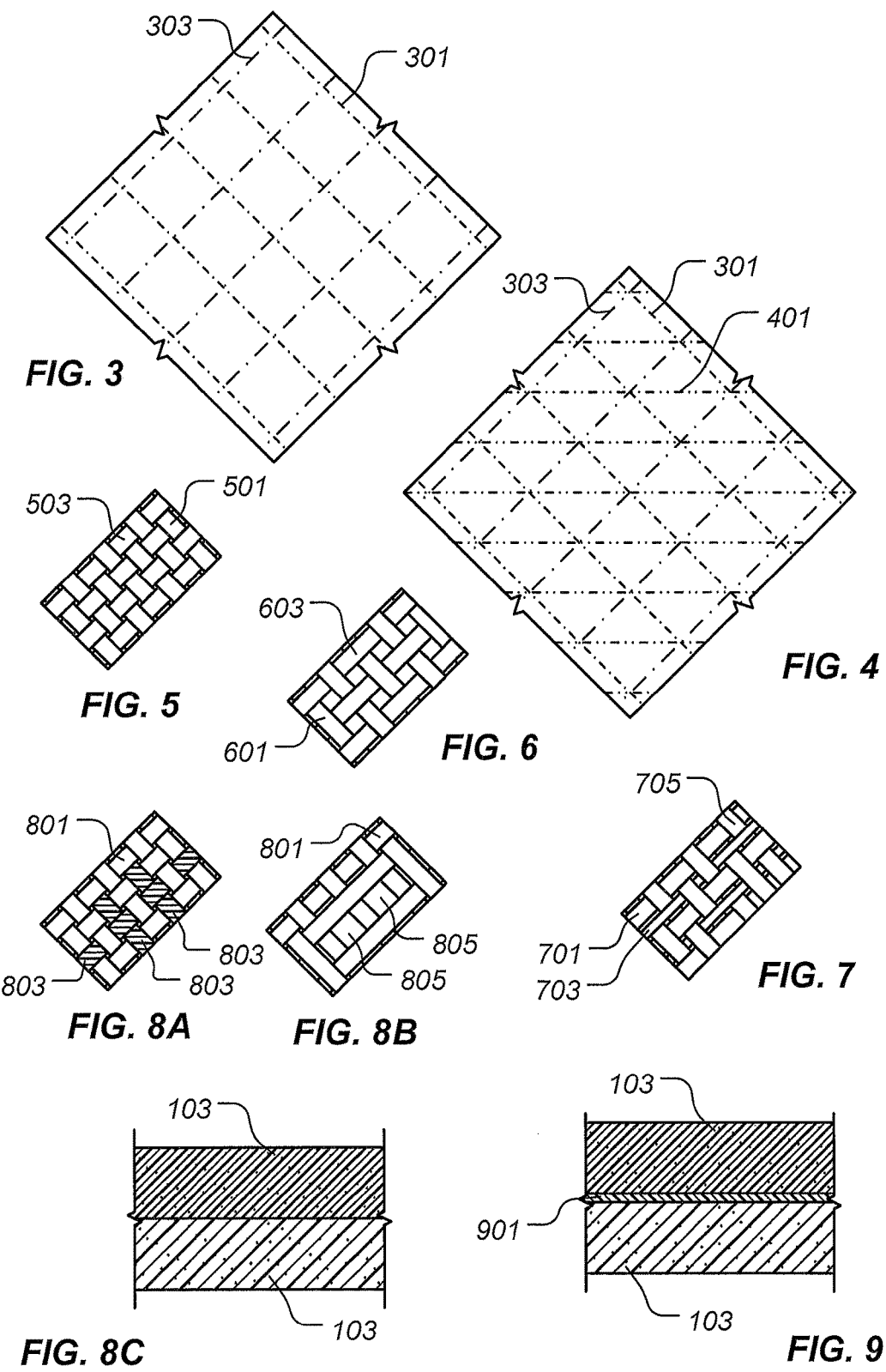

COMPOSITE CORE AND METHOD OF MAKING SAME

TECHNICAL FIELD

The present application relates in general to the field of composite structures.

DESCRIPTION OF THE PRIOR ART

Composite structures, such as composite sandwich structures, are often used because of their high strength-to-weight ratio. Such structures are frequently used in the manufacture of aircraft, such as airplanes, helicopters, and the like. Composite sandwich structures typically include an upper skin, a lower skin, and a core adhesively bonded between the upper skin and the lower skin. The upper and lower skins are made of a composite material, such as carbon, graphite, glass fibers, or the like disposed in a polymeric matrix, such as epoxy, polyetheretherketone, or the like. The core often comprises a honeycomb structure made from resin-infused paper.

The use of conventional sandwich structures, however, is limited in some applications because the core of the sandwich structure fails to provide substantive mechanical strength in some implementations. In other words, the strength of such a conventional sandwich structure is limited by the strength of the core.

Efforts have been made to manufacture core that provides better specific mechanical strength at a reduced cost. One particular honeycomb core utilizes a plurality of composite webs or ribbons extending across the core, such that each of the webs defines one-half of a row of cells of the core. Such an approach doubles the wall thickness of adjacent cell nodes effectively increasing the weight of the core by approximately 30% without a comparable increase in load carrying capability. One drawback with a stacked ribbon block is the doubling of some walls where the ribbons contact each other resulting in different stiffness and strength in the ribbon direction and in the perpendicular direction to the ribbons. The core is also difficult to tailor in the ribbon direction. In addition, if a load concentration exists in the core, it is difficult to manufacture a core block that has thicker cell walls only in the region local to the concentration. Furthermore, there is a potential weakness in the joint where the ribbons intersect, especially in core block comprising a plurality of procured ribbons bonded in a secondary operation. If an unbalanced or unsymmetrical layup is used in each ribbon, the ribbon will distort or twist after cure, thereby making a stacking procedure of a block of ribbons more difficult and also trapping residual stresses.

There are many cores well known in the art for use in composite sandwich structures; however, considerable room for improvement remains.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIGS. 3-8B are stylized, top, plan views of illustrative fiber configurations of a portion of the core of FIG. 1;

FIGS. 8C and 9 are enlarged, cross-sectional views of certain embodiments of a portion of the core of FIG. 1, as indicated in FIG. 2;

Figure 1:
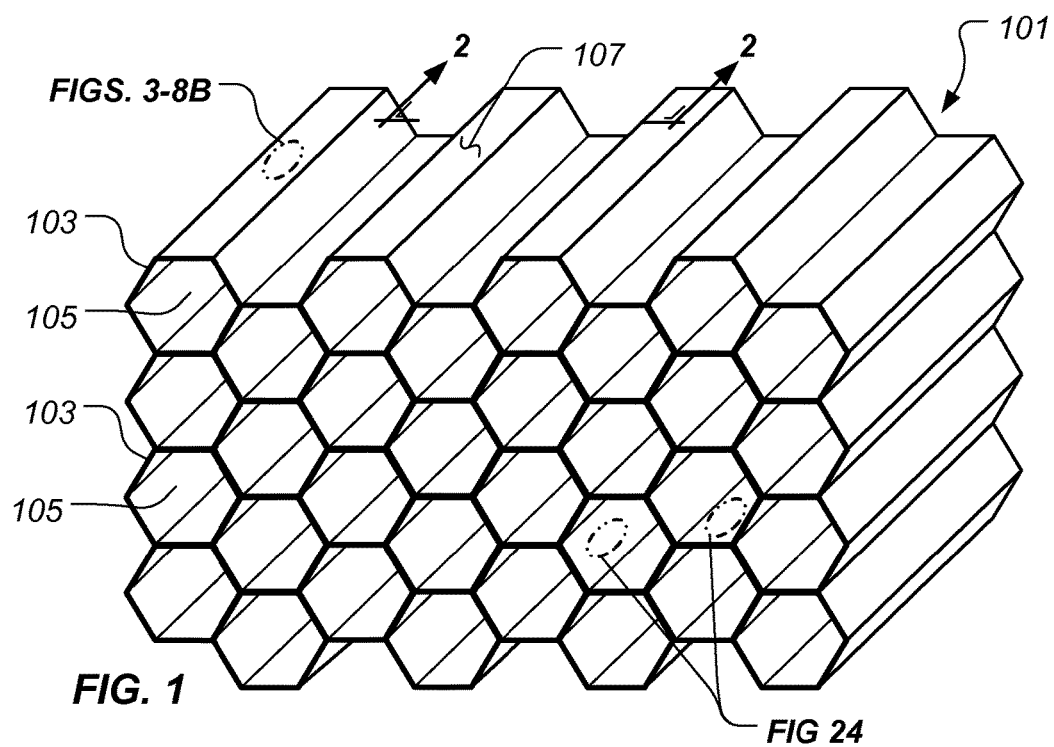
FIG. 1 is a perspective view of an illustrative embodiment of a composite core according to the present application.

While the application is susceptible to various modifications and alternative forms, specific embodiments thereof have been shown by way of example in the drawings and are herein described in detail. It should be understood, however, that the description herein of specific embodiments is not intended to limit the application to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

There is a need for an improved core for use in composite sandwich structures.

Therefore, it is an object of the present application to provide an improved core for use in composite sandwich structures.

This and other objects are achieved by a composite core, which includes a plurality of tubes, each of the plurality of tubes comprising a single tow or split tow of fibers wound in a single candy stripe pattern. Adjacent tubes of the plurality of tubes are placed adjacent to one another along sides of the adjacent tubes. A resin is introduced into the preform by a number of means, including vacuum assisted resin transfer molding, resin film infusion, or towpreg.

Another object of the present application allows for the winding angle to be varied in order to provide for the optimum core shear and compression strength. The winding angle can be spaced apart to reduce the amount of material used and provide for a porous core wall with a plurality of small holes.

This and other objects are achieved by a composite core, which includes a plurality of tubes, each the plurality of tubes comprising a plurality of fibers disposed in a polymeric matrix. Adjacent tubes of the plurality of tubes are adhesively bonded, or infused, to one another along sides of the adjacent tubes.

In another aspect of the present application, a method of making a composite core is provided. The method includes the steps of providing a plurality of tubes, each of the plurality of tubes including a plurality of fibers disposed in a polymeric matrix, or subsequently infusing with a polymeric matrix, and adhesively bonding adjacent tubes of the plurality of tubes along sides of the adjacent tubes.

In yet another aspect of the present application, a composite sandwich structure is provided. The composite sandwich structure includes a first skin, a core, and a first adhesive layer adhesively bonded, infused, or otherwise attached to the first skin and a first face of the core. The core includes a plurality of tubes, each the plurality of tubes comprising a plurality of fibers disposed in a polymeric matrix, such that adjacent tubes of the plurality of tubes are adhesively bonded, or otherwise attached to one another along sides of the adjacent tubes.

The present application represents a composite, open-celled core and a method of making the composite core. The core includes a plurality of tubes (i.e., hollow, cylindrical structures) arranged in a two-dimensional array, such that adjacent tubes are adhesively bonded to one another. Each of the tubes comprises a plurality of reinforcing fibers disposed in a polymeric matrix. In one embodiment, at least one of the tubes comprises a plurality of braided fibers disposed in the polymeric matrix. In another embodiment, at least one of the tubes comprises a plurality of fibers formed generally in a helical shape disposed in a polymeric matrix. The tubes may take on many different cross-sectional configurations, such as triangular, square, rectangular, pentagonal, hexagonal, heptagonal, octagonal, or the like. Furthermore, the core may include a combination of tube shapes. For example, the core may include a combination of octagon shaped tubes and square shaped tubes in a geometric pattern.

FIG. 1 depicts a first illustrative embodiment of a composite, open-celled core 101 according to the present application. Core 101 comprises a plurality of tubes 103 arranged in a two-dimensional array. Note that only two tubes 103 are labeled in FIG. 1 for clarity. Each of tubes 103 defines a passageway or "cell" 105 extending therethrough. Core 101 may comprise any suitable number, size, cross-sectional shape, and construction of tubes 103, as will be discussed in greater detail below.

Figure 2:
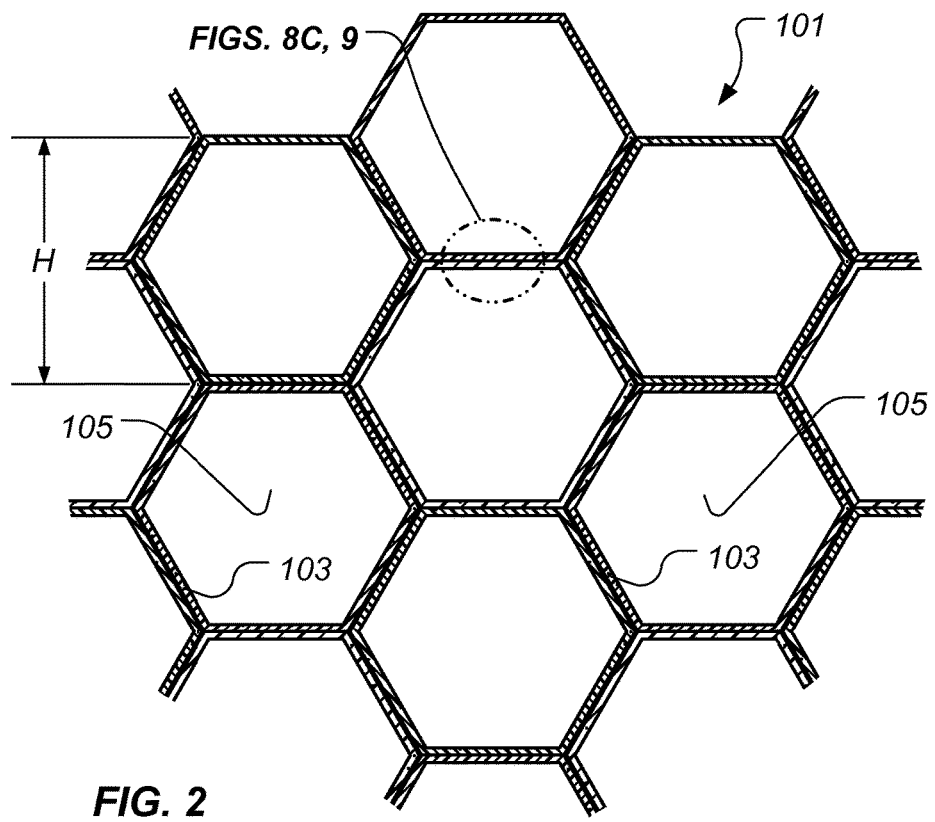
FIG. 2 is an enlarged, cross-sectional view of a portion of the composite core of FIG. 1 taken along the line 2-2 of FIG. 1.

FIG. 2 depicts a cross-sectional view of a portion of core 101 taken along a line 2-2 in FIG. 1. Each of tubes 103 comprises a plurality of reinforcement fibers disposed in a polymeric matrix. For example, tubes 103 may comprise fibers comprising one or more of carbon, graphite, glass, an aromatic polyamide "aramid") material, a variant of an aromatic polyamide material (e.g., a polyparaphenylene terephthalamide material, such as Kevlar® by E. I. du Pont de Nemours and Company of Richmond, Va.), or the like. The scope of the present application, however, encompasses fibers comprising any suitable material or combination of materials. The polymeric matrix may comprise any suitable thermoplastic or thermosetting resin. Exemplary resins include epoxy, polyimide, polyamide, bismaleimide, polyester, vinyl ester, phenolic, polyetheretherketone (PEEK), polyetherketone (PEK), polyphenylene sulfide (PPS), and the like.

The fibers of tubes 103 may be oriented in one or more directions and may be woven or unwoven. Exemplary embodiments of fiber arrangements of tubes 103 are shown in FIGS. 3-8B. FIG. 3 depicts one illustrative embodiment of a portion of tube 103 indicated in FIG. 1. In the illustrated embodiment, tube 103 comprises a plurality of fibers 301 (only one labeled for clarity) extending in a first direction and a plurality of fibers 303 (only one labeled for clarity) extending in a second direction. It should be appreciated that tube 103 may alternatively only include fibers 301 arranged in a single direction, such as a uniaxial or helical fiber configurations. It should be noted that fibers 301 and 303 are depicted as fiber centerlines. Fibers 301 and 303 are oriented in a biaxial fiber configuration. Fibers 301 overlap fibers 303. In one embodiment, fibers 301 are woven about fibers 303. In another embodiment, fibers 301 are woven about fibers 303 and fibers 303 are woven about fibers 301. In yet another embodiment, a first ply comprises fibers 301 and a second ply comprises fibers 303, such that the second ply is laid-up over the first ply. Alternatively, the first ply comprises one or more of fibers 301 and fibers 303, while the second ply comprises fibers 301 and fibers 303 not present in the first ply. Moreover, the scope of the present application contemplates two or more of fibers 301 to be parts of a single fiber or two or more of fibers 303 to be parts of a single fiber.

FIG. 4 depicts an alternative, illustrative embodiment of the portion of tube 103 indicated in FIG. 1. In the illustrated embodiment, tube 103 exhibits a triaxial fiber configuration, comprising a plurality of fibers 401 (only one labeled for clarity) extending in a third direction in addition to fibers 301 and fibers 303. Note that fibers 301, fibers 303, and fibers 401 are depicted as fiber centerlines. Fibers 401 overlap fibers 301 and fibers 303. In one embodiment, fibers 301 are woven about fibers 303 and fibers 401. In another embodiment, fibers 301 and fibers 303 are woven about fibers 401. In one embodiment, fibers 301 are woven about fibers 303 and fibers 401, while fibers 303 are woven about fibers 301 and fibers 401.

Alternatively, in another embodiment, a first ply comprises fibers 301, a second ply comprises fibers 401, and a third ply comprises fibers 303, such that the second ply is disposed between the first ply and the third ply. It should be noted, however, that the scope of the present application encompasses any suitable arrangement of first, second, and third plies. Moreover, the scope of the present application encompasses the first, second, and third plies comprising any suitable combination of fibers 301, fibers 303, and fibers 401. Furthermore, as in the embodiment of FIG. 3, the scope of the present application contemplates two or more of fibers 301 to be parts of a single fiber or two or more of fibers 303 to be parts of a single fiber.

FIG. 5 depicts one particular illustrative configuration of the portion of tube 103 indicated in FIG. 1. In this embodiment, a plurality of fibers 501 (only one labeled for clarity) extending in a first direction and a plurality of fibers 503 (only one labeled for clarity) extending in a second direction are woven about one another such that only small gaps (e.g., a gap 505) exist between adjacent fibers of fibers 501 and between adjacent fibers of fibers 503. Once tube 103 is cured (i.e., the polymeric matrix has either hardened or crosslinked), the polymeric matrix substantially fills these gaps. Accordingly, fluids are inhibited from passing through the gaps.

In an alternative embodiment, shown in FIG. 6, fibers may be spaced apart so that the polymeric matrix does not fill gaps between the fibers. In the illustrated embodiment, tube 103 comprises a plurality of fibers 601 (only one labeled for clarity) extending in a first direction and a plurality of fibers 603 (only one labeled for clarity) extending in a second direction, such that gaps (e.g., a gap 605) larger than the gaps of FIG. 5 exist between adjacent fibers of fibers 601 and between adjacent fibers of fibers 603. Even after tube 103 is cured, the polymeric matrix does not completely fill the gaps. Accordingly, fluids may pass through the gaps.

It should be noted that certain fibers of tube 103 may differ in size or material than other fibers of tube 103. Moreover, certain fibers may be woven about only certain other fibers or may be woven about groups of two or more fibers. For example, in the embodiment of FIG. 7, the portion of tube 103 indicated in FIG. 1 comprises a plurality of fibers 701 (only one labeled for clarity) extending in a first direction, a plurality of fibers 703 (only one labeled for clarity) extending in the first direction, and a plurality of fibers 705 (only one labeled for clarity) extending in a second direction. Note that fibers 703 are smaller than fibers 701 or fibers 705. In one implementation, fibers 703 comprise a different material than the material of fibers 701 and fibers 705. It should be noted that the scope of the present application encompasses a combination of any number of fiber materials in tube 103. It should also be noted that, in some embodiments, not all of the fibers of tube 103 are individually woven about one another.

It should be noted that the embodiment of FIG. 6 may also be modified to have the configuration of FIG. 7, in that larger gaps exist between adjacent fibers. It should also be noted that one or more of tubes 103 may comprise woven material, such as illustrated in FIGS. 5-8B, in the form of woven broadgoods, braided sleeves, flat braids, or braided broadgoods. Moreover, any of the embodiments of FIGS. 5-8B may exhibit a triaxial configuration.

FIGS. 8A and 8B depict one particular illustrative configuration of the portion of tube 103 indicated in FIG. 1. In this embodiment, a plurality of fibers 801 (only one labeled for clarity) extending in a first direction and a second direction are woven with one or more removable bands 803, about one another. Removable bands 803 are configured to be removed in a post cure operation, thus producing gaps 805. For example, removable bands 803 may include a soluble material such that a flushing exposure to water would dissolve and remove bands 803, thereby producing gaps 805 (as shown in FIG. 8B). Removable bands 803 may be introduced in a variety of configurations and quantities, thereby producing selected weave pattern. The configurations of removable bands 803 with plurality of fibers 801 can be selectively chosen to produce gaps 805 and configured for a selected flow rate between and among cells 105 of core 101.

As shown in FIG. 2, adjacent sides of tubes 103 are adhesively bonded, or otherwise attached, to one another to form core 101. FIGS. 8C and 9 depict enlarged views of a portion, indicated in FIG. 2, of core 101. In the embodiment of FIG. 8C, adhesive bonds between tubes 103 are formed by polymeric matrices of adjacent tubes 103. In other words, the polymeric matrix of one tube 103 bonds directly to the polymeric matrix of an adjacent tube 103. Fibers in one tube 103 are crosslinked with fibers of adjacent tube 103, which is further described in regard to FIG. 24. Alternatively, as depicted in FIG. 9, adhesive bonds between tubes 103 are provided by an adhesive layer 901 disposed between tubes 103.

Returning to FIG. 2, tubes 103 exhibit any desired cross-sectional height H. For example, core 101 may include tubes 103 having a height H of about six millimeters or may include tubes 103 that have the height H of about 50 millimeters. The scope of the present application, however, is not limited by these exemplary heights H. Rather, core 101 may comprise tubes 103 having any desired size, e.g., height H. Moreover, core 101 may comprise different sized tubes 103. In other words, core 101 may comprise one or more tubes 103 having sizes that are different from one or more other tubes 103. For example, core 101 may comprise tubes 103 having different heights H.

Figure 10:
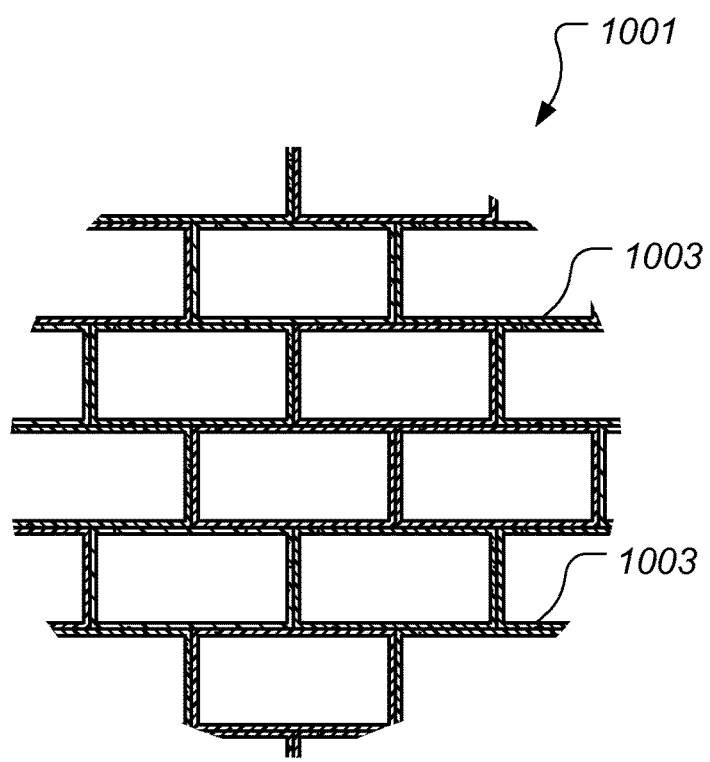
FIG. 10 is a cross-sectional view of an illustrative embodiment, alternative to that of FIG. 2, of a composite core according to the present application.

Tubes 103 of the embodiment illustrated in FIGS. 1 and 2 exhibit hexagonal cross-sectional shapes. The scope of the present application, however, is not so limited. Rather, a core of the present application may comprise tubes having any shape suitable for the implementation of the core. For example, as shown in FIG. 10, a core 1001 comprises a plurality of rectangular tubes 1003. Note that only two tubes 1003 are labeled in FIG. 10 for clarity. As in the previous embodiment, adjacent tubes 1003 are adhesively bonded, or otherwise attached, to one another. Other aspects of tubes 1003 generally correspond to the aspects of tubes 103 discussed above and shown in FIGS. 1-9.

The core of the present application, such as core 101 (shown in FIGS. 1 and 2) and core 1001 (shown in FIG. 10), may be produced using any suitable method. It should be noted that, while the particular manufacturing embodiments discussed below and illustrated in the drawings are directed to the manufacture of core 101, the embodiments apply equally to the manufacture of core 1001 or any other core encompassed within the scope of the present application.

Figure 11:
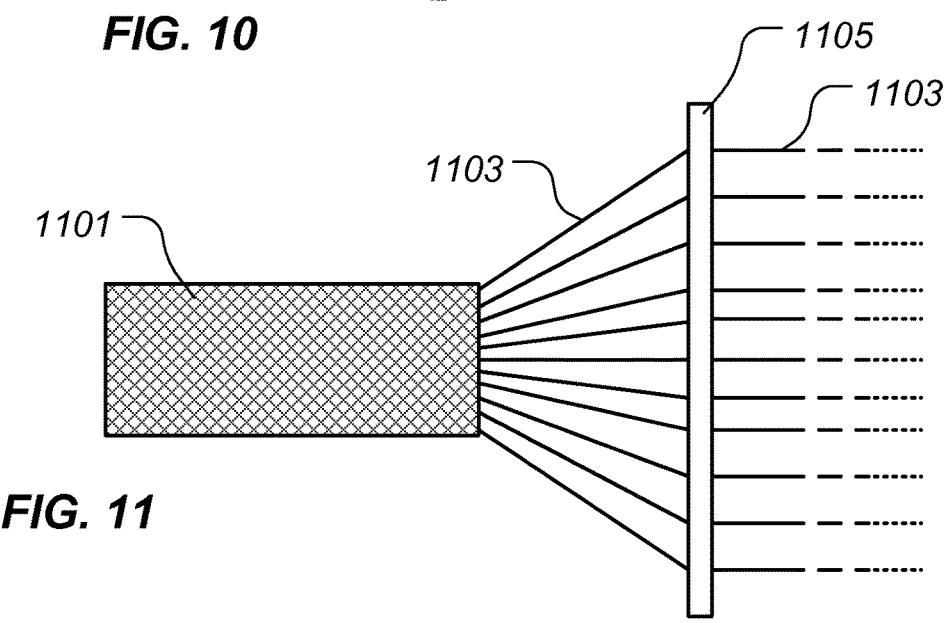
FIG. 11 is a stylized, side, elevational view of a sleeve of the present application being braided, illustrating one particular embodiment of a method according to the present application for making the sleeve.
Figure 12:
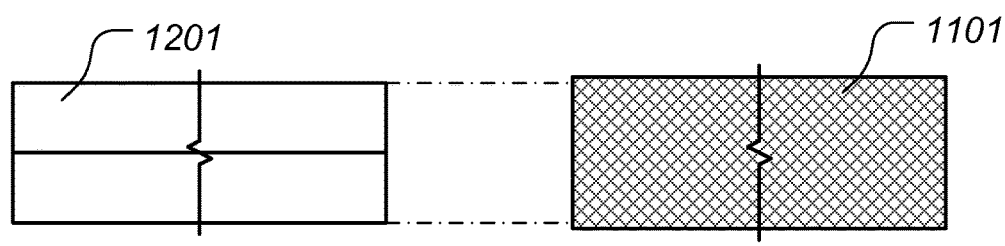
FIG. 12 is a stylized, side, elevational view of the sleeve of FIG. 11 being placed on a mandrel, further illustrating the method of FIG. 11 of making the sleeve.

In one embodiment, shown in FIG. 11, tube 103 (shown in FIGS. 1 and 2) is made by braiding a sleeve 1101 of fibers 1103 (only one labeled for clarity) using a braiding machine 1105. Sleeve 1101 may comprise, for example, a biaxial arrangement of fibers 1103 or a triaxial arrangement of fibers 1103, as discussed above. Fibers 1103 may comprise dry fibers or resin-coated fibers, such as fibers coated with a thermoplastic resin. As shown in FIG. 12, sleeve 1101 is place over a mandrel 1201 after sleeve has been braided. Note that, in the illustrated embodiment, mandrel 1201 exhibits a size and shape corresponding to cell 105 (see FIG. 1 or 2). Mandrel 1201 and sleeve 1101 are subsequently assembled with other mandrels and sleeves, as will be discussed in greater detail below, to form core 101 (shown in FIG. 1).

Figure 13:
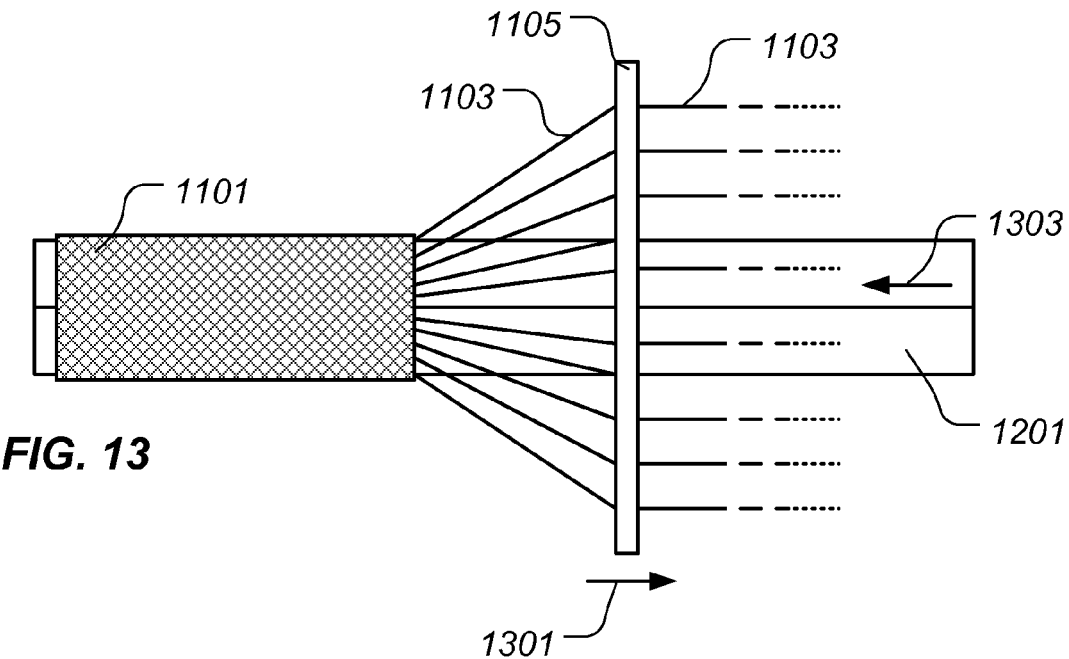
FIG. 13 is a stylized, side, elevational view of a sleeve of the present application being braided onto a mandrel, illustrating one particular embodiment of a method, according to the present application, for making the sleeve.

It should be noted that, as shown in FIG. 13, sleeve 1101 may be braided directly onto mandrel 1201. In such an embodiment, fibers 1103 are secured to mandrel 1201, if only frictionally, prior to braiding sleeve 1101. Braiding machine 1105 may be advanced along mandrel 1201, as indicated by an arrow 1301, as sleeve 1101 is braided. Mandrel 1201 may be advanced with respect to braiding machine 1105, as indicated by an arrow 1303, instead of or in addition to braiding machine 1105 being advanced along mandrel 1201.

Figure 14:
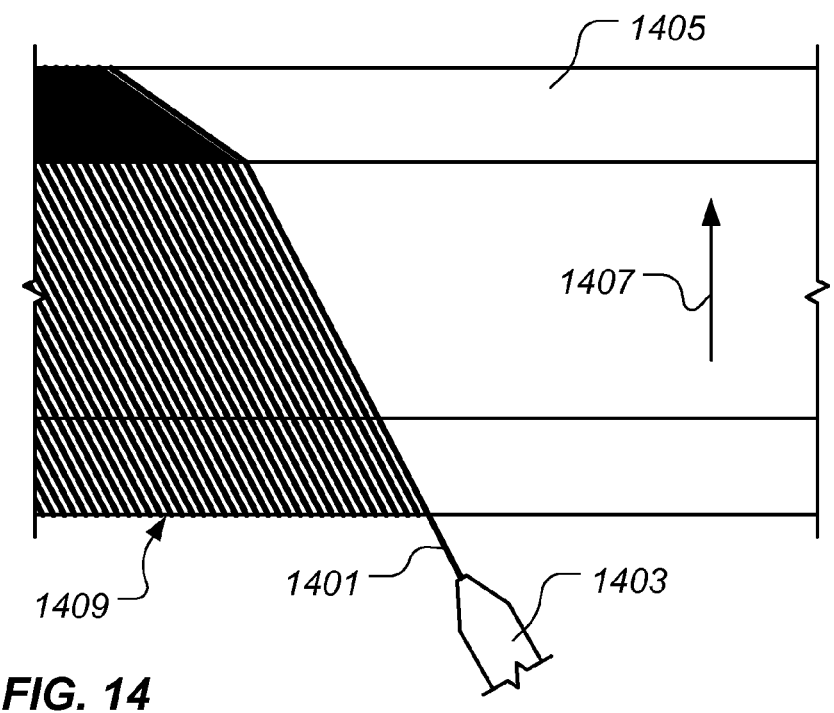
FIG. 14 is a stylized, top, plan view of an illustrative embodiment of a composite core tube of the present application being made using a filament winding process, illustrating one particular method, according to the present application, for making the composite core tube.

In another embodiment, shown in FIG. 14, tube 103 (shown in FIGS. 1 and 2) is made using a filament winding process. A continuous, resin-impregnated fiber 1401, extending from a filament winding machine 1403, is wound about a mandrel 1405. The resin can be either a thermosetting or thermoplastic resin and becomes the polymeric matrix of tube 103 upon curing tube 103. The material placement process may be conducted in a variety of processes; however, it is preferred that the mandrel 1405 moves axially while a spool of fiber 1401 rotates around the mandrel 1405, as indicated by an arrow 1407. Alternatively, a spool or a plurality of spools of material could rotate around the mandrel. Relative motion of the material dispensing mechanism to the mandrel is inferred. As fiber 1401 is wound onto mandrel 1405 by filament winding machine 1403, a helical shaped pattern is formed. One or more plies 1409 of fiber 1401, in desired orientations with respect to mandrel 1405, are wound onto mandrel 1405 to form tube 103. The angle of which fiber 1401 is wound about mandrel 1405 may vary along the length of the mandrel 1405 in order to customize the strength of the core. For example, the angle of the fiber 1401 may be dynamically changed during the material placement process in order to customize a compressive strength of the core. Note that, in the illustrated embodiment, mandrel 1405 exhibits a size and shape corresponding to cell 105 (see FIG. 1 or 2). It should be further noted, however, that the present application is not limited to the particular illustrated configurations of filament winding machine 1403 or mandrel 1405. Mandrel 1405 and the one or more plies 1409 that have been filament wound onto mandrel 1405 are subsequently assembled with other mandrels and plies, as will be discussed in greater detail below, to form core 101 (shown in FIG. 1). It should further be appreciated that upon cutting of plies 1409 and the mandrel 1405, the material may have a tendency to un-wind. A band of material, potentially adhesive or fibrous, may be used to keep fiber 1401 from unraveling upon cutting of the plies 1409 and the mandrel 1405. An adhesive material with unidirectional fibers could be used to band the fiber 1401 on mandrel 1405 and remain compatible with the base material.

Figure 15:
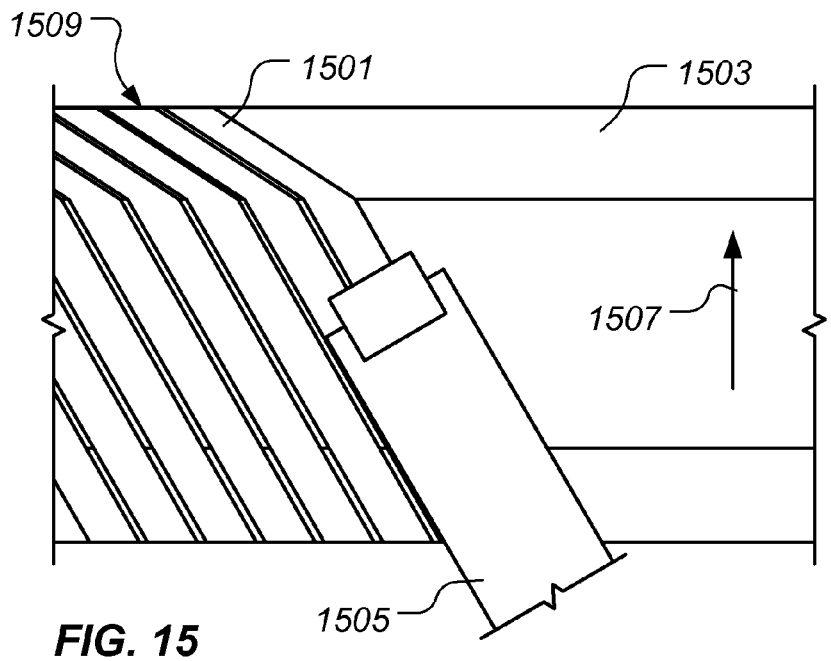
FIG. 15 is a stylized, top, plan view of an illustrative embodiment of a composite core tube of the present application being made using a fiber placement process, illustrating one particular embodiment of a method, of the present application, for making the composite core tube.

In yet another embodiment, shown in FIG. 15, tube 103 (shown in FIGS. 1 and 2) is made using a fiber placement process. A continuous, resin-impregnated tow 1501 (only one labeled for clarity) of approximately 1000 fibers is applied to a mandrel 1503 by a fiber placement machine 1505. It should be appreciated that tow 1501 may also be portions of a full tow; for example, tow 1501 may be a half tow of 500 fibers. In lieu of a tow 1501, a tape of fibers, cut to a prescribed width, may be used. A pre-cut tape of fibers may be referred to as a "slit-tape." A slit-tape allows the user to more closely control the width dimension, as compared to a tow of fibers. Exemplary prescribed widths of slit-tape include ⅛" and ¼", to name a few. The resin can be either a thermosetting or thermoplastic resin and becomes the polymeric matrix of tube 103 upon curing tube 103. During the fiber placement process, mandrel 1503 moves axially while tow 1501 rotates around the mandrel 1503, as indicated by an arrow 1507. As tow 1501 is applied to mandrel 1503 by fiber placement machine 1505, a helical shaped pattern is formed. One or more plies 1509 of tow 1501, in desired orientations with respect to mandrel 1503, are wound onto mandrel 1503 to form tube 103. It should be appreciated that more than one tow 1501 of different materials may be used. Note that, in the illustrated embodiment, mandrel 1503 exhibits a size and shape corresponding to cell 105 (see FIG. 1 or 2). It should be further noted, however, that the present application is not limited to the particular illustrated configurations of fiber placement machine 1505 or mandrel 1503. Mandrel 1503 and the one or more plies 1509 that have been fiber placed onto mandrel 1503 are subsequently assembled with other mandrels and plies, as will be discussed in greater detail below, to form core 101 (shown in FIG. 1).

Figure 24:
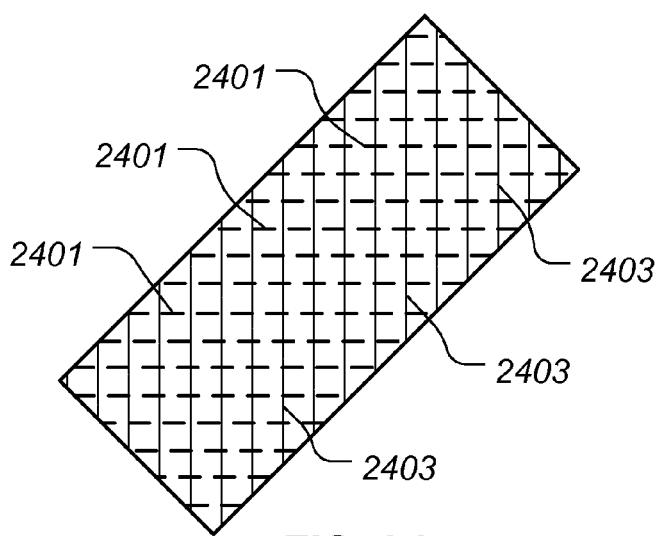
FIG. 24 is a stylized, top, plan view of illustrative fiber configuration of a portion of the core of FIG. 1.

It is important to note that adjacent tubes 103, as best shown in FIG. 1, are located so that fibers in a first tube 103 crosslink with fibers in an adjacent tube 103 where adjacent tubes 103 contact each other, as shown in FIG. 8C. Referring to FIG. 24 as an illustrative embodiment, fibers 2401 are represented as dashed lines in order to clarify that fibers 2401 are from a tube 103 adjacent to another fibers 2403 of another tube 103, as shown in FIG. 1. It should be appreciated that fibers 2401 and 2403 may be actual individual fibers, or centerlines for a plurality of fibers, such as fibers in tow 1501. In the example shown in FIG. 24, tubes 103 are created by winding fibers about a mandrel at an angle (such as mandrels 1405 and 1503) as shown in FIGS. 14 and 15. Fibers 2401 and 2403 are each wound about a different mandrel, but in a similar orientation. However, when mandrels are placed together in a mold, as shown in FIG. 18, fibers 2401 and 2403 are oriented to each other in a crosslinking pattern. For example, when fibers 2401 and 2403 are each wound about a mandrel at a same direction and a same 45 degree angle, then fibers 2401 and 2403, of adjacent tubes 103, actually have a 90 degree crosslinking orientation to each other. It should be appreciated that multiple mandrels having similarly oriented wound fibers are assembled adjacently, without changing the orientation of the mandrels, so as to produce crosslinking of fibers in adjacent tubes 103. After curing, crosslinked fibers 2401 and 2403 provide strength to core 101. It should be appreciated that fibers 2401 and 2403 of adjacent tubes 103 can be wound about a mandrel in a variety of orientations; for example, fibers 2401 and 2403 may be wound about a mandrel at 30 degree orientations such that fibers 2401 and 2403 are crosslinked at 120 degree orientations to each other. It should also be appreciated that fibers 2401 and 2403 may be braided, instead of being wound, onto mandrels in a variety of patterns; nevertheless, fibers 2401 and 2403 of adjacent tubes 103 become further crosslinked during processing. An exemplary method of processing multiple adjacent tubes 103 to form core 101 is described in relation to FIGS. 17-20.

Figure 16:
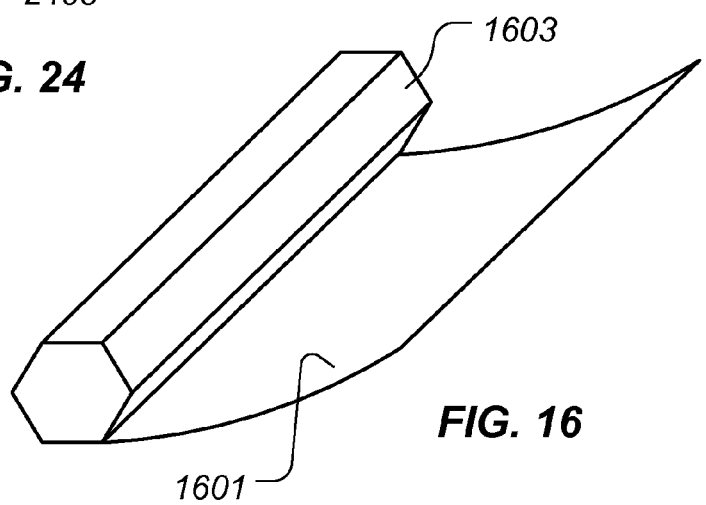
FIG. 16 is a stylized, perspective view of an alternate method, according to the present application, for making a composite core tube of the present application.

Alternatively, tube 103 (shown in FIGS. 1 and 2) may be made using manual, hand-layup methods. For example, as shown in FIG. 16, one or more plies 1601 having desired fiber orientations are applied onto a mandrel 1603 to form tube 103. The one or more plies 1601 may comprise woven dry fibers, unwoven dry fibers, resin-impregnated woven fibers, or resin-impregnated unwoven fibers. Note that, in the illustrated embodiment, mandrel 1603 exhibits a size and shape corresponding to cell 105 (see FIG. 1 or 2). It should be further noted, however, that the present application is not limited to the particular illustrated configurations of the one or more plies 1601 or mandrel 1603. Mandrel 1603 and the one or more plies 1601 that have been applied onto mandrel 1603 are subsequently assembled with other mandrels and plies, as will be discussed in greater detail below, to form core 101 (shown in FIG. 1).

Figure 17:
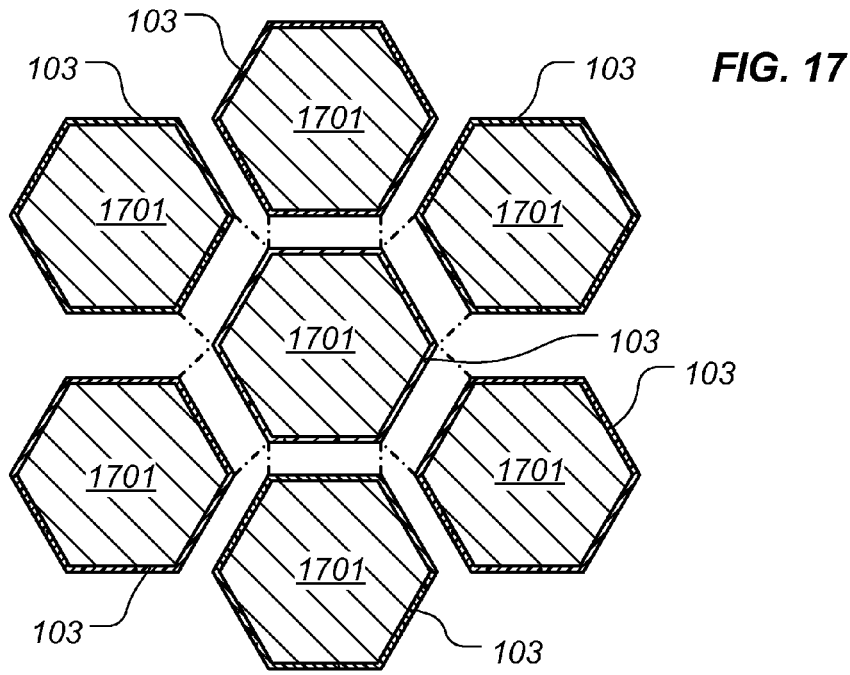
FIG. 17 is a stylized, exploded, cross-sectional view of a plurality of mandrels and composite core tubes as assembled for processing the plurality of composite core tubes into a composite core of the present application.
Figure 18:
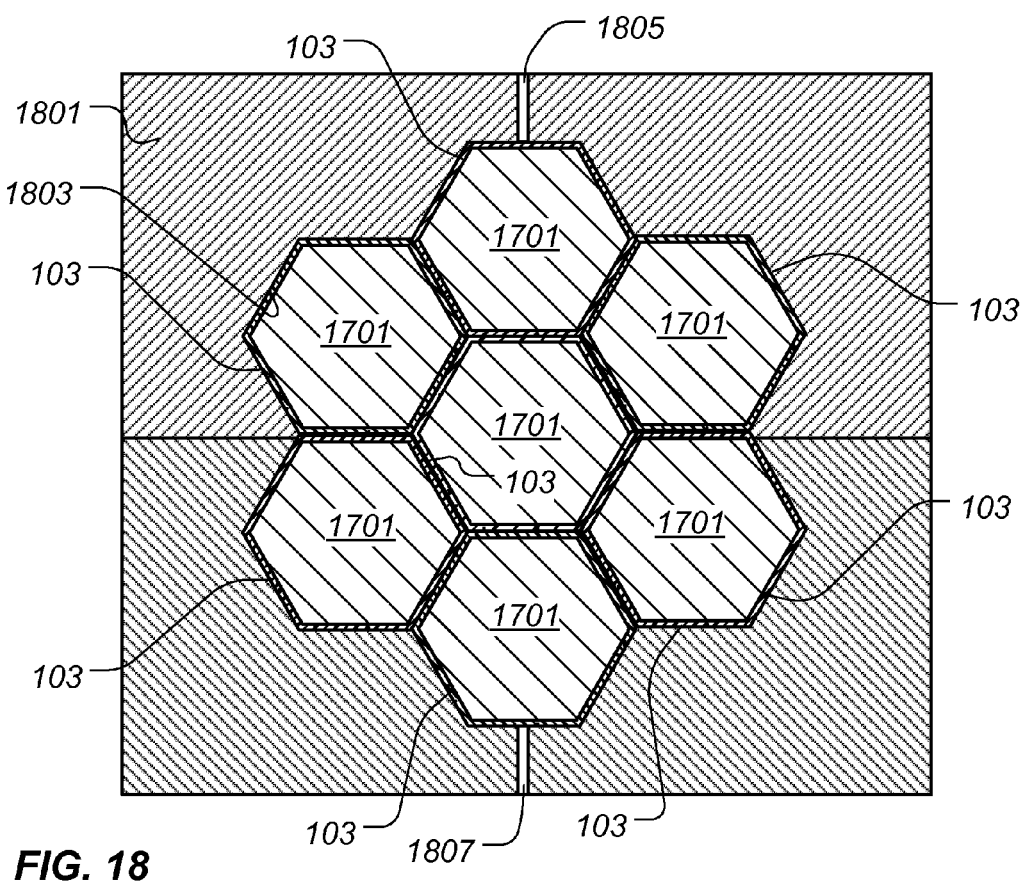
FIG. 18 is a stylized, cross-sectional view illustrating one particular embodiment of a method for processing a plurality of composite core tubes into a composite core of the present application.

As shown in FIG. 17, a plurality of mandrels 1701 (corresponding to mandrels 1201, 1405, 1503, 1603, or the like) and tubes 103 are assembled together to form the basis for core 101 (shown in FIG. 1). Note that the plurality of mandrels 1701 and tubes 103 may include any suitable number of mandrels 1701 and tubes 103 in any suitable configuration to form core 101. In one embodiment, shown in FIG. 18, the plurality of mandrels 1701 and tubes 103 are assembled together in a mold 1801. Note that mold 1801 is not limited to the configuration depicted in FIG. 18 but may take on any suitable configuration. An inner surface 1803 of mold 1801 has the form of an exterior surface 107 (see FIG. 1) of core 101.

In one embodiment, tubes 103 comprise a thermosetting polymeric matrix that is cured prior to assembling mandrels 1701 and tubes 103 into mold 1801. In such an embodiment, adhesive layer 901 (shown in FIG. 9) is applied between adjacent tubes 103 prior to assembling mandrels 1701 and tubes 103 into mold 1801. In another embodiment, tubes 103 comprise a thermoplastic polymeric matrix or comprise a thermosetting polymeric matrix that is not cured prior to assembling mandrels 1701 and tubes 103 into mold 1801. In such an embodiment, adhesive layer 901 may be applied between adjacent tubes 103 prior to assembling mandrels 1701 and tubes 103 into mold 1801, but is not required.

If fibers pre-impregnated with polymeric resin are used in tubes 103, heat and, in some embodiments, pressure is applied to tubes 103 after mandrels 1701 and tubes 103 have been assembled into mold 1801. If tubes 103 are not cured prior to assembly into mold 1801, the applied heat cures tubes 103. If adhesive layers 901 are used to adhesively bond adjacent tubes 103, the applied heat melts and cures adhesive layers 901.

If dry fibers are used in tubes 103, in one embodiment, a thermoplastic or thermosetting polymeric resin is introduced about the dry fibers via one or more ports 1805, 1807. The polymeric resin becomes the polymeric matrix of tubes 103. Processes such as resin transfer molding, vacuum-assisted resin transfer molding, or the like can be used to accomplish the introduction of the polymeric resin about the dry fibers. Heat and, in some embodiments, pressure is applied to tubes 103 to cure the polymeric resin.

After the adjacent tubes 103 are adhesively bonded to one another to form core 101, mandrels 1701 are removed from tubes 103. In one embodiment, mandrels 1701 are merely withdrawn from tubes 103. In other embodiments, however, mandrels 1701 are dissolved, for example, by heat or a solvent. In one embodiment, mandrels 1701 are water soluble and, thus, water is used to dissolve mandrels 1701. In the embodiment wherein the mandrel is dissolvable, the mandrel may remain the core to aid in stabilizing the core during machining of the core. The mandrel may also remain inside the core after machining and during the processing and curing of the skins in order to stabilize the core during the processing and curing. Next, the mandrel could be dissolved with water, or removed through a similar means. It should be appreciated that the mandrels can also be comprised of several layers, including an outside soluble material that remains with the core, and an inside metal material that is removed after the core is processed.

Figure 19:
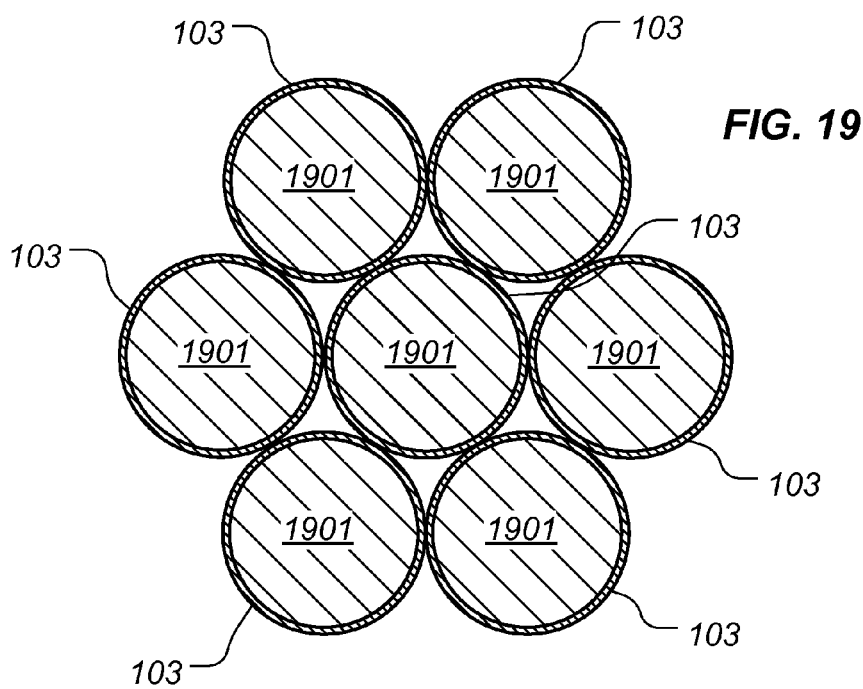
FIG. 19 is a stylized, exploded, cross-sectional view of a plurality of expandable mandrels and composite core tubes as assembled for processing the plurality of composite core tubes into a composite core of the present application.
Figure 20:
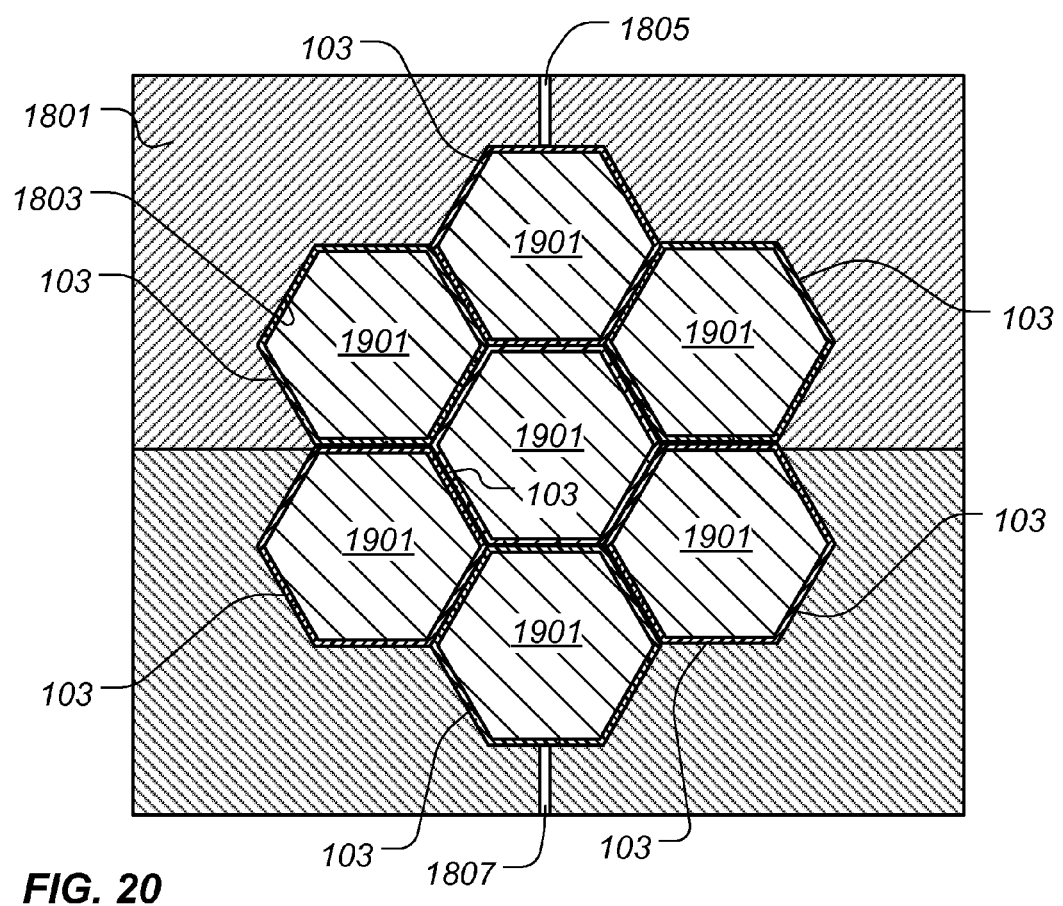
FIG. 20 is a stylized, cross-sectional view illustrating one particular embodiment of a method for processing a plurality of composite core tubes in expandable mandrels, into a composite core of the present application.

FIGS. 19 and 20 represent another illustrative embodiment a mandrel 1901 used to create core 101. An expandable mandrel 1901 may be used such that tubes 103 are formed on expandable mandrels 1901 for formation of core 101. Expandable mandrel 1901 is preferably constructed of a material that expands in volume when subjected to heat, or any other catalyst that would tripper volumetric expansion. Expandable mandrels 1901, with tubes 103, are then stacked and arranged in a selected pattern while in their pre-expanded state, as shown in FIG. 19. Expandable mandrels 1901 are preferably confined in a mold 1801 such that volumetric expansion of expandable mandrels 1901 forces tubes 103 to formed to a specified shape and pattern. The pattern shown in FIGS. 19 and 20 is merely exemplary of a variety of shapes and patterns to which expandable mandrels 1901 can be arranged. For example, mandrels 1901 can be stacked directly adjacent, above, and below so as to form tubes 103 into a square shape. One exemplary advantage of expandable mandrels 1901 is that a variety of core 101 shapes can be manufactured from a single sized mandrel. In addition, it is simpler to wind fibers onto a round mandrel versus a multi-faceted mandrel.

Figure 21:
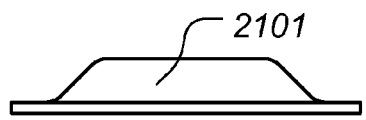
FIG. 21 is a stylized, side, elevational view of an illustrative embodiment of a composite sandwich structure according to the present application.
Figure 22:
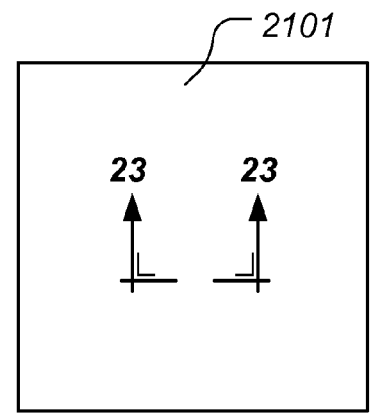
FIG. 22 is a stylized, top, plan view of the composite sandwich structure of FIG. 21.
Figure 23:
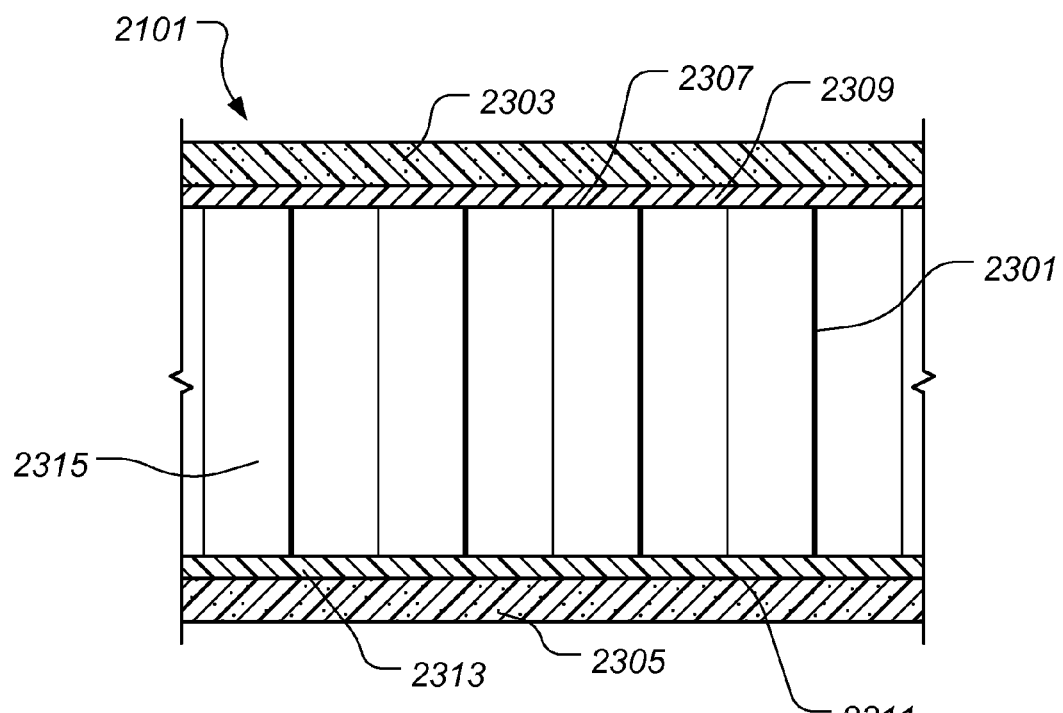
FIG. 23 is a cross-sectional view of the composite sandwich structure of FIG. 21, taken along the line 23-23 in FIG. 22.

The scope of the present application encompasses a composite sandwich structure comprising a core of the present application. For example, FIGS. 21 and 22 illustrate a side, elevational view and a top, plan view, respectively, of a composite sandwich structure 2101 according to the present application. As shown in FIG. 23, which is a cross-sectional view of a portion of composite sandwich structure 2101, composite sandwich structure 2101 comprises a core 2301 disposed between an upper skin 2303 and a lower skin 2305. Upper skin 2303 is adhesively bonded to an upper face 2307 of core 2301 by a first adhesive layer 2309. Lower skin 2305 is adhesively bonded to a lower face 2311 by a second adhesive layer 2313. It should be noted that, in various embodiments, one of upper skin 2303 and lower skin 2305 may be omitted.

In one embodiment, adhesive layers 2309, 2313 extend substantially only between core 2301 and skins 2303, 2305, respectively. In other words, adhesive layers 2309, 2313 are omitted over open cells 2315 of core 2301. This configuration is accomplished, in one embodiment, by concentrating adhesive on the edge surfaces of the core through a reticulation process.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that an application with significant advantages has been described and illustrated. Although the present application is shown in a limited number of forms, it is not limited to just these forms, but is amenable to various changes and modifications without departing from the spirit thereof.

The invention claimed is:

1. A composite core, comprising:
 a first tube and a second tube, the first tube and the second tube having a plurality of fibers woven with a plurality of removable bands and disposed in a polymeric matrix, wherein at least some of the plurality of removable bands are woven with others of the plurality of removable bands to produce a weave pattern; and
 a first end portion of each of the first tube and the second tube being configured to support a first face sheet and a second end portion of each of the first tube and the second tube being configured to support a second face sheet;
 wherein the plurality of fibers of each of the first tube and the second tube are in contact with each other to form a cross-linked pattern, which in turn secures the first tube to the second tube via the plurality of fibers; and
 wherein the plurality of fibers of each tube are arranged in a uniaxial configuration so as to be arranged in a single direction, such that the plurality of fibers of each tube crosslink with fibers of adjacent tubes, the crosslinking being generated even though each tube has a plurality of fibers only in a single direction.

2. The composite core, according to claim 1, wherein the plurality of fibers of the first tube and the second tube have been wound in a single helical direction to form each tube.

3. The composite core, according to claim 1, wherein the first tube has an octagonal cross section, and the second tube has a square cross section.

4. The composite core, according to claim 1, wherein the plurality of fibers of the first tube comprises:
 a first set of fibers extending in a first direction; and
 a second set of fibers extending in a second direction, the second set of fibers woven about the first set of fibers.

5. The composite core, according to claim 1, wherein the plurality of fibers of the first tube comprises:
 a first set of fibers extending in a first direction; and
 a second set of fibers extending in a second direction, the second set of fibers overlaying the first set of fibers.

6. The composite core, according to claim 1, wherein the plurality of fibers of the first tube comprises:
 a first set of fibers of a first material; and
 a second set of fibers of a second material.

7. The composite core, according to claim 1, wherein the plurality of fibers of the first tube comprises:
 a first set of fibers exhibiting a first size; and
 a second set of fibers exhibiting a second size.

8. The composite core, according to claim 1, further comprising:
 an adhesive layer disposed between the first tube and the second tube.

9. The composite core, according to claim 1, wherein the removable bands are configured to be removed during a post-operation thereby producing gaps in the weave pattern between the first tube and the second tube.

10. A composite sandwich structure, comprising:
 a first skin;
 a core comprising:
  a first tube and a second tube, the first tube and a the second tube having a plurality of fibers woven with a plurality of removable bands and disposed in a polymeric matrix, the removable bands being configured to dissolve during a post cure operation, wherein at least some of the plurality of removable bands are woven with others of the plurality of removable bands in a weave pattern;
 wherein the plurality of fibers of each of the first tube and the second tube are in contact with each other to form a cross-linked pattern, which in turn secures the first tube to the second tube via the plurality of fibers;
 wherein the plurality of fibers of each tube are arranged in a uniaxial configuration so as to be arranged in a single direction, such that the plurality of fibers of each tube crosslink with fibers of adjacent tubes, the crosslinking being generated even though each tube has a plurality of fibers only in a single direction; and
 wherein the first skin is adhesively bonded to a first end face of the core.

11. The composite sandwich structure, according to claim 10, further comprising:
 a second skin adhesively bonded to a second end face of the core.

* * * * *